(12) United States Patent
Peuser et al.

(10) Patent No.: US 9,948,093 B2
(45) Date of Patent: Apr. 17, 2018

(54) DEVICE AND METHOD FOR DISCHARGING AN ENERGY ACCUMULATOR IN A HIGH-VOLTAGE GRID

(75) Inventors: Thomas Peuser, Ludwigsburg (DE); Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 1116 days.

(21) Appl. No.: 13/984,064

(22) PCT Filed: Dec. 29, 2011

(86) PCT No.: PCT/EP2011/074215
§ 371 (c)(1),
(2), (4) Date: Aug. 7, 2013

(87) PCT Pub. No.: WO2012/107145
PCT Pub. Date: Aug. 16, 2012

(65) Prior Publication Data
US 2013/0320755 A1    Dec. 5, 2013

(30) Foreign Application Priority Data
Feb. 8, 2011 (DE) .................. 10 2011 003 764

(51) Int. Cl.
*B60L 3/04* (2006.01)
*H02J 1/00* (2006.01)
*B60L 3/00* (2006.01)

(52) U.S. Cl.
CPC .............. *H02J 1/00* (2013.01); *B60L 3/0046* (2013.01); *B60L 3/04* (2013.01); *B60L 2270/20* (2013.01); *Y10T 307/406* (2015.04)

(58) Field of Classification Search
CPC .......... B60L 3/0046; B60L 3/00; B60L 7/003; B60L 11/14; B60L 3/003; B60L 3/04;
(Continued)

(56) References Cited

U.S. PATENT DOCUMENTS

2002/0044465 A1* 4/2002 Tsai .................... H02J 1/10
363/55
2003/0111972 A1* 6/2003 Strothmann ............ B60L 11/00
318/268
(Continued)

FOREIGN PATENT DOCUMENTS

DE 102004057693   6/2006
DE 102008010980   8/2009
(Continued)

OTHER PUBLICATIONS

International Search Report for Application No. PCT/EP2011/074215 dated Jul. 26, 2012 (2 pages).

*Primary Examiner* — Hal Kaplan
*Assistant Examiner* — Thai Tran
(74) *Attorney, Agent, or Firm* — Michael Best & Friedrich LLP

(57) ABSTRACT

The invention relates to a device and method for discharging an energy accumulator (C), in particular an intermediate circuit capacitor, in a high-voltage grid (3), in particular in a direct current intermediate circuit in a motor vehicle, having a direct current converter (5) connected downstream of the high-voltage grid (3), a low-voltage grid (4) connected downstream of the direct current converter (5), an power grid (7) connected downstream of the direct current converter (5) and parallel to the low-voltage grid (4) for supplying energy to a control circuit (9) of the direct current converter (5), and a first controllable switching element (S) which is connected to the connecting line between the direct current converter (5) and the low-voltage grid (4) and by means of which, in the event of a disturbance of the low-voltage grid (4), the direct current converter (5) and the power grid (7) can be disconnected from the low-voltage grid (4). The power grid (7) is connected to the direct current converter (5) via a first electrical component (10; 20) which
(Continued)

prevents a backflow of current from the power grid (7) into the direct current converter (5).

17 Claims, 3 Drawing Sheets

(58) Field of Classification Search
CPC ......... B60L 7/00; B60L 2210/04; H02H 9/00; H02H 7/122; H02H 9/04; H02P 3/22; H02P 27/06; H02P 3/18; Y02T 10/642; H02M 7/48
USPC ....................................................... 307/10.1
See application file for complete search history.

(56) References Cited

U.S. PATENT DOCUMENTS

| | | | | |
|---|---|---|---|---|
| 2003/0117019 | A1* | 6/2003 | Furukawa | B60L 1/02 307/10.6 |
| 2009/0058339 | A1* | 3/2009 | Kitano | B60K 6/445 318/400.22 |
| 2009/0160249 | A1* | 6/2009 | Soma | B60L 11/005 307/9.1 |
| 2009/0183718 | A1* | 7/2009 | Casasso | F02P 19/025 123/623 |
| 2010/0250043 | A1* | 9/2010 | Scheucher | B60L 11/1861 701/22 |
| 2010/0315043 | A1* | 12/2010 | Chau | B60L 3/0046 320/134 |
| 2011/0006726 | A1 | 1/2011 | Dittmer et al. | |
| 2011/0057627 | A1 | 3/2011 | Kuehner | |
| 2012/0055727 | A1* | 3/2012 | Omiya | B60K 6/445 180/279 |

FOREIGN PATENT DOCUMENTS

| | | |
|---|---|---|
| DE | 102008032317 | 12/2009 |
| DE | 102008061585 | 6/2010 |

* cited by examiner

DEVICE AND METHOD FOR DISCHARGING AN ENERGY ACCUMULATOR IN A HIGH-VOLTAGE GRID

BACKGROUND OF THE INVENTION

The invention relates to a device and a method for discharging an energy storage device, in particular an intermediate circuit capacitor, in a high-voltage network, in particular a direct-current intermediate circuit in a motor vehicle.

In the case of hybrid vehicles or motor vehicles having an electric drive or a fuel cell drive, voltages are generally used that can amount to several 100 volt. Voltages that are greater than 60 volt are described in this case as "high-voltage". For reasons of protecting life and health, it must be possible to switch off high-voltage vehicle electrical systems in motor vehicles and to discharge said systems within a predetermined time period. Known high-voltage vehicle electrical systems comprise for this purpose active and/or passive discharge devices. The high-voltage vehicle electrical system in a hybrid vehicle or a motor vehicle having an electric drive or a fuel cell drive—frequently also referred to as direct-current intermediate circuit—comprises in the simplest case an energy source in the form of a battery, a voltage converter having a direct-current intermediate current capacitor that is used as a buffer capacitor for stabilizing the operating voltage of electric consumers, one or a plurality of electric machines and further high-voltage consumers. Following a separation of the high-voltage network from the energy source, which separation can be achieved, for example, by pulling out the relevant plug connection during the course of maintenance work or also as a result of an accident, all the energy storage devices that are connected to the high-voltage network or to the direct-current intermediate circuit must be discharged (emergency rapid discharge). In so doing, it is possible for capacitors, such as an intermediate circuit capacitor, or for example also powering-down motors to function as energy storage devices. A conventional passive discharge device, i.e. a discharge device, whose function is ensured even in the event of all the supply and control lines failing, provides in so doing in the simplest case an ohmic discharge resistor that is permanently connected in parallel to the intermediate circuit capacitor.

DE 10 2007 047 713 A1 discloses a method for discharging a high-voltage network, in particular a direct-current intermediate circuit that can be connected to an energy source by means of at least one resistor, in which the at least one resistor is used as a common resistor both for charging or pre-charging and also for discharging the intermediate circuit capacitors of the direct-current intermediate circuit.

A further device known from DE 10 2008 010 978 A1 for discharging an electrical network or an electrical component, comprising a switchable resistor, provides that the switchable resistor comprises a PCT resistor and a switch that are thermally coupled and further provides that the control connection of the switch is connected to the network voltage.

A device is known from DE 10 2004 057 693 A1 for rapidly discharging a capacitor, in particular an intermediate circuit capacitor, wherein the capacitor is connected by way of an alternating-current converter to an electric motor and is connected by way of a direct-current converter to a further electric charge storage device, in particular a battery in a vehicle electrical system. In so doing, the direct-current converter comprises means that effect a rapid discharge of the capacitor whilst correspondingly controlling the direct-current converter. In particular, a resistor is connected by means of a switch to the direct-current converter on the battery side for receiving the electric power that is to be discharged.

SUMMARY OF THE INVENTION

The present invention provides a device for discharging an energy storage device, in particular an intermediate circuit capacitor, in a high-voltage network, in particular a direct-current intermediate circuit in a motor vehicle, having a direct-current converter connected downstream of the high-voltage network, a low-voltage network connected downstream of the direct-current converter, an energy supply network that is connected downstream of the direct-current converter and is connected in parallel to the low-voltage network in order to supply energy to a control circuit of the direct-current converter and to a first controllable switching element, which switching element is connected in the connecting line between the direct-current converter and the low-voltage network and by means of which switching element in the case of a malfunction of the low-voltage network the direct-current converter and the energy supply network can be separated from the low-voltage network.

The present invention further provides a method for discharging an energy storage device, in particular an intermediate circuit capacitor, in a high-voltage network, in particular a direct-current intermediate circuit in a motor vehicle, whilst using a device in accordance with the invention, wherein in the event of a malfunction of the low-voltage network the direct-current converter and the energy supply network are separated from the low-voltage network.

The device in accordance with the invention is based on the fundamental idea of supplying energy to a control circuit in a direct-current converter in such a manner that the energy supply remains intact even if the low-voltage network, for example a 12V vehicle electrical system of a motor vehicle, malfunctions, for example as a result of an accident. The malfunction can in this case, for example, be in the form of a short circuit or also in the form of a voltage drop in the low-voltage network. Consequently, the control circuit of the direct-current converter remains functional even in the case of a malfunctioning low-voltage network and it can also be charged even in the case of a necessary emergency rapid discharge from the energy storage device that is to be discharged, i.e. for example from the intermediate circuit capacitor, and as a consequence said energy storage device can be discharged. Consequently, a costly, additional emergency discharge circuit is not required.

In order to increase the safety and reliability of the system even in the event of a short circuit at the output of the direct-current converter, the energy supply network can be connected to the direct-current converter by means of a first electrical component that prevents a backflow of current from the energy supply network into the direct-current converter.

If the system is started up, then the high-voltage circuit is initially discharged. In order to be able to control the direct-current voltage even when starting up the system, the associated control circuit must be supplied with energy in a different manner during the start-up. In accordance with an embodiment of the device in accordance with the invention, the energy supply network is therefore connected to the low-voltage network by means of a second electric component that prevents a backflow of current from the energy supply network into the low-voltage network. In this manner, the control circuit of the direct-current converter can be supplied with energy by means of the low-voltage network during the start-up of the system, i.e. when the energy storage device of the high-voltage network is not charged.

In accordance with a particularly simple embodiment of the invention, the first and/or the second electric component that prevents a backflow of energy into the direct-current converter and/or the low-voltage network, are embodied as diodes. In order to reduce the losses that occur in so doing, Schottky diodes are used in an advantageous manner since these comprise a comparatively low conducting-state resistance.

Alternatively, it is also possible instead of using diodes to use controllable switching elements, for example in the form of transistors, as the first and/or second electric components. These also have a comparatively low conducting-state resistance and consequently contribute to reducing the losses.

On the basis of the first controllable switching element being arranged in the connecting line between the direct-current converter and the low-voltage network, said first controllable switching element, that is used to separate the low-voltage network from the direct-current converter and from the energy supply network, can also be used to provide inverse-polarity protection. Polarity reversal can occur, for example, during the course of an external start-up or also as a result of a phase change caused in any other manner on the low-voltage side of the direct-current converter. Although direct-current converters can be embodied up to a particular current value and can be time-limited in an inverse-polarity protected manner, it is, however, expedient in order to avoid permanent damage to the direct-current converter to provide inverse-polarity protection on the low-voltage side of the direct-current converter. In the case of many systems, an inverse-polarity protection is already provided in the form of an inverse-polarity protection transistor. This can then be used for the purpose of separating in accordance with the invention the low-voltage network without incurring any additional costs.

In the case of many applications, such as in multi-voltage vehicle electrical systems in hybrid and electric vehicles, the high-voltage network is connected to an electric machine by means of an alternating-current converter, in particular a pulse-controlled alternating-current converter. In this case, it is advantageous also to supply energy from the energy supply network to a control circuit of the alternating-current converter. Consequently, the control circuit of the alternating-current converter also remains functional in the case of a malfunctioning low-voltage network. This has, on the one hand, the advantage that in the event of a necessary emergency rapid discharge from the energy storage device that is to be discharged, i.e. for example from the intermediate circuit capacitor, the said control circuit can be charged and said energy storage device can as a consequence be additionally discharged. On the other hand, the functional control circuit can also be used for the purpose of switching the electric machine to a safe and reliable operation, for example in the form of an active short circuit.

In accordance with a further embodiment of the invention, the energy supply network is also used to supply energy to further electric consumers. In this case, one or a plurality of these additional consumers can be used if necessary (emergency rapid discharge) to discharge the energy storage device that is to be discharged.

If the energy supply network is connected to the low-voltage network by means of a third controllable switching element that prevents a backflow of current from the energy supply network into the low-voltage network, then it is provided in accordance with an embodiment of the method in accordance with the invention that the third controllable switching element is closed in order to start-up the system in the event that the energy storage device is not charged.

BRIEF DESCRIPTIONS OF THE DRAWINGS

Further features and advantages of embodiments of the invention are evident in the description hereinunder with reference to the attached figures.

DETAILED DESCRIPTION

Figure 1:
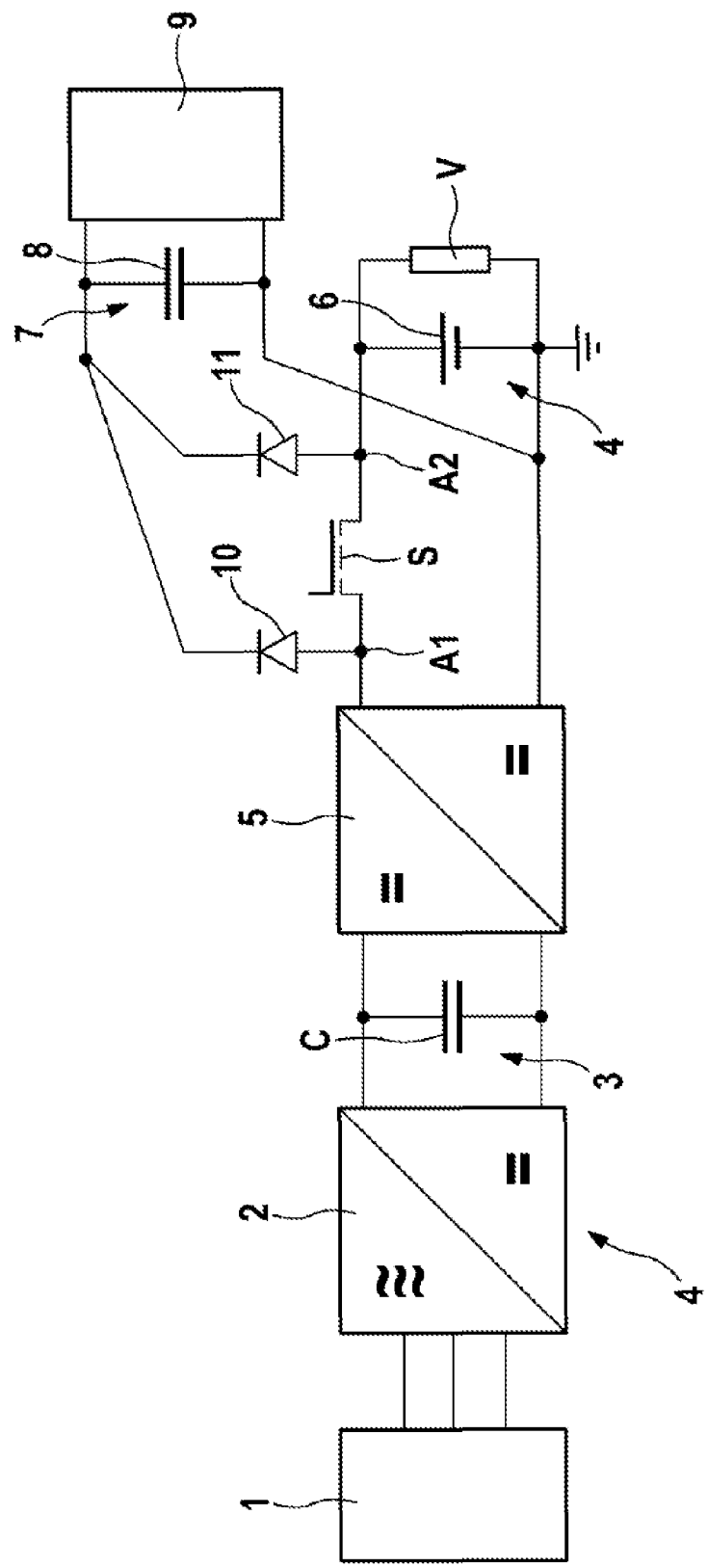
FIG. 1 shows a schematic illustration of a first embodiment of a device in accordance with the invention for discharging an energy storage device of a high-voltage network.

Identical components or components that have an identical function are identified in the figures in each case by the identical reference numeral.

An electric machine 1 is connected to a high-voltage network 3, frequently also described as a direct-current intermediate circuit, by means of an alternating-current converter 2, for example in the form of a pulse-controlled alternating-current converter. The high-voltage network can be, for example, a high-voltage vehicle electrical system of a hybrid vehicle, electric vehicle or a fuel cell vehicle. The high-voltage network 3 comprises an energy storage device in the form of an intermediate circuit capacitor C that is conventionally used as a buffer capacitor in order to stabilize the operating voltage of consumers that are connected to the high-voltage network 3. The connection between the high-voltage network 3 and a low-voltage network 4 is produced by means of a direct-current converter (DC/DC-convertor) 5. The low-voltage network 4 comprises a charge storage device in the form of a low-voltage battery 6 and for example a consumer V.

In particular situations, such as following an accident or prior to maintenance being performed on the motor vehicle, the high-voltage network 3 can become separated from a high-voltage energy source, not illustrated. For reasons of protecting life and health, it must be possible in the event of the high-voltage network 3 becoming separated from the high-voltage energy source to rapidly reduce the charge stored in the intermediate circuit capacitor C.

For this purpose, a first controllable switching element S in the form of a transistor is provided in the connecting line between the direct-current converter 5 and the low-voltage network 4. Since this transistor can also be used to provide inverse-polarity protection, it is also frequently described as an inverse-polarity protection transistor. An energy supply network 7 is connected in parallel to the low-voltage network 4. The energy supply network 7 comprises an energy storage device in the form of a buffer capacitor 8 and is used to supply energy to a control circuit 9 for controlling the direct-current converter 5. It is also possible to connect to the energy supply network 7 further control circuits, such as a control circuit for the alternating-current converter 2 and further consumers, not illustrated.

The energy supply network 7 is connected on the one hand to the reference potential, in the illustrated exemplary embodiment to ground. On the other hand, the energy supply network 7 is connected by way of a first diode 10 to the output of the direct-current converter 5 and by way of a second diode 11 to the low-voltage network 4. This consequently produces a switching topology in which the first controllable switching element S in the form of an inverse-polarity protection transistor is arranged between the two connection points A1 and A2 of the energy supply network. The two diodes 10 and 11 prevent in each case a backflow of energy from the energy supply network 7 into the direct-current converter 5 and/or into the low-voltage network 4.

In the normal operation, i.e. free of malfunctions, the first controllable switching element S is connected in the form of the inverse-polarity protection transistor. If the high-voltage network 3 is now separated from the high-voltage energy source, it is then possible when the low-voltage network 4 is functioning correctly for the intermediate circuit capacitor C to be discharged with the aid of the direct-current converter 5 into the low-voltage network 4. If on the other hand, a malfunction in the form of a voltage interruption or a short circuit also occurs in the low-voltage network 4, then the inverse-polarity protection transistor is opened and as a consequence the low voltage network 4 is separated from the direct-current voltage 5 and from the energy supply network 7. The intermediate circuit capacitor C can now be discharged by means of the energy supply network 7 into the control circuit 9 and if necessary into further control circuits or consumers that are connected to the energy supply network 7. In so doing, a malfunction in the form of a voltage interruption can then, for example, be diagnosed if the voltage of the low-voltage network falls below a voltage threshold value for a predeterminable time period. In so doing, the voltage threshold can also be predetermined in dependence upon further operating parameters of the entire system.

The intermediate circuit capacitor C is initially not charged immediately following a system start-up. In this case, the buffer capacitor 8 of the energy supply network 7 is charged by means of the second diode 11 from the low-voltage network 4 and consequently the control circuit 8 and if necessary further control circuits and consumers are supplied with energy.

Figure 2:
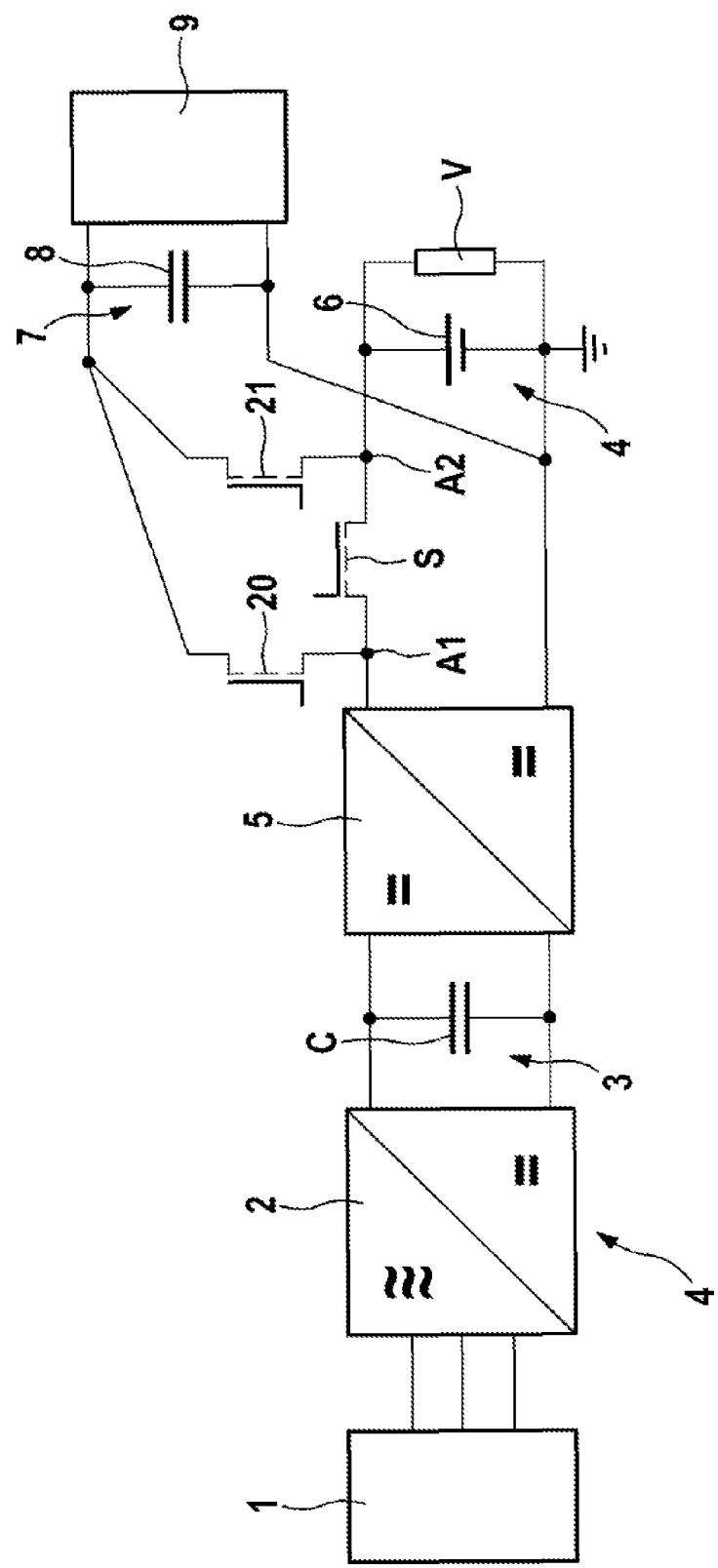
FIG. 2 shows a schematic illustration of a second embodiment of a device in accordance with the invention for discharging an energy storage device of a high-voltage network and FIG. 3 shows a schematic illustration of a second embodiment of a device in accordance with the invention for discharging an energy storage device of a high-voltage network.

FIG. 2 shows a second embodiment of the device in accordance with the invention. This differs from the first embodiment merely by virtue of the fact that the two diodes 10 and 11 are replaced by a second controllable switching element 20 and/or third controllable switching element 21, for example in the form of transistors. Also these switching elements 20 and 21 are used essentially to prevent a backflow of energy from the energy supply network 7 into the direct-current converter 5 and/or into the low-voltage network 4. The switching elements 20 and 21 assume in this respect a function similar to that of a diode. However, the two switching elements 20, 21 comprise an extremely low conducting-state resistance that contributes in particular to reducing the losses.

As long as there is no malfunction in the form of a voltage interruption or a short circuit in the low-voltage network 4, the first switching element S (inverse-polarity protection transistor) and the second switching element 20 are connected and/or interconnected, whereas the third switching element 21 is open and/or closed. If a malfunction now occurs in the low-voltage network 4, then in a similar manner to the first embodiment the inverse-polarity protection transistor is opened and in this manner the low-voltage network 4 is separated from the direct-current converter 5 and from the energy supply network 7. It is then possible to discharge the intermediate circuit capacitor C in a similar form to the first embodiment. In order to start-up the system in the case of a discharged intermediate circuit capacitor C, the second switching element 20 can be opened and the third switching element 21 closed, so that the buffer capacitor 8 of the energy supply network 7 can in turn be charged from the low-voltage network 4 and consequently the control circuit 8 and if necessary further control circuits and consumers can be supplied with energy.

Figure 3:
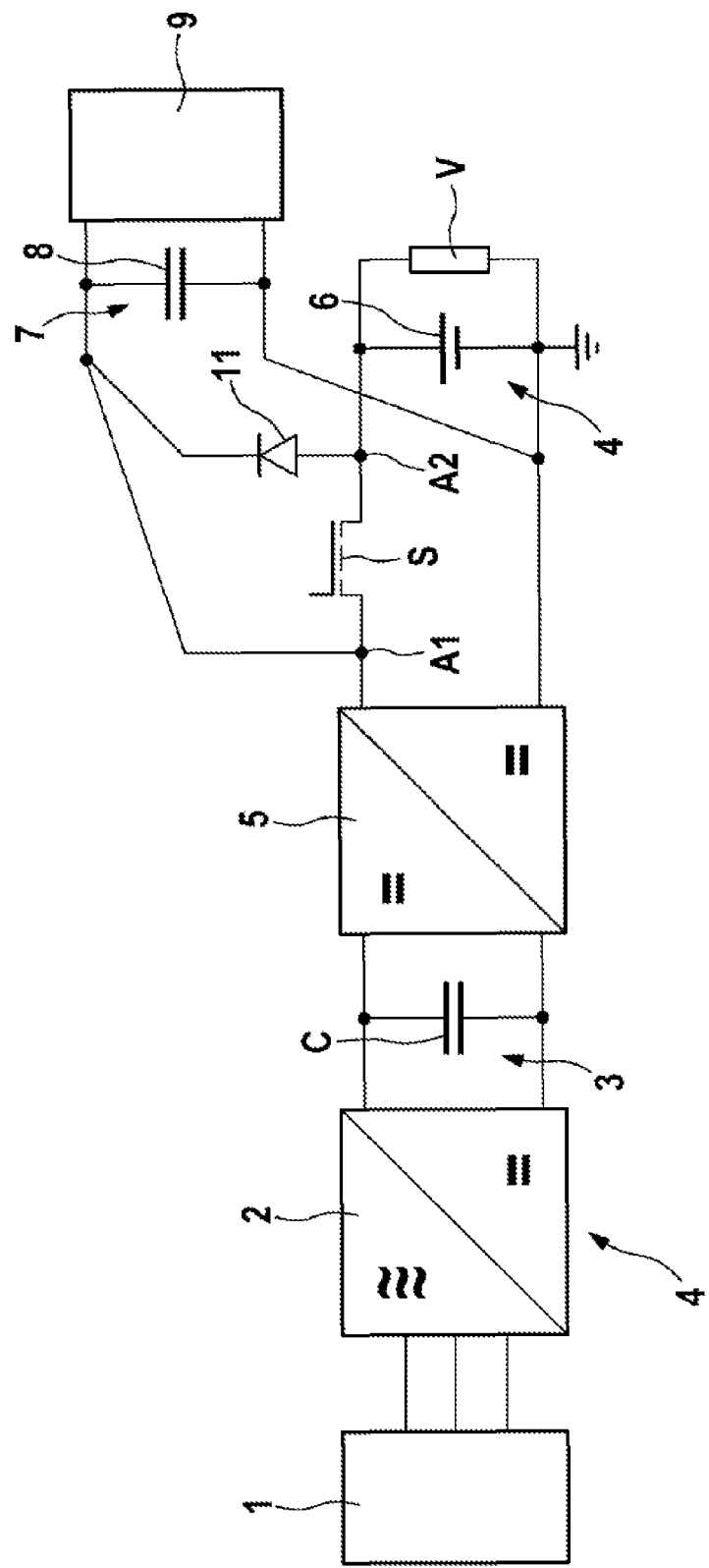

The electric component in the connecting line between the direct-current converter 5 and the energy supply network 7, i.e. the diode 10 and/or the second controllable switching element 20 is/are used in particular to protect the direct-current converter 5 in the event of a short circuit at the output of the direct-current converter 5. In this respect, this component is not required for the purely emergency rapid discharge of the intermediate circuit capacitor C and can also be omitted. FIG. 3 shows a corresponding third embodiment. In this case, the energy supply network 7 is connected to the low-voltage network 4 in a similar manner to the first embodiment by means of the second diode 11. The third embodiment differs in this respect from the first embodiment illustrated in FIG. 1 only by virtue of the fact that the first diode 10 is omitted. Naturally, the second diode 11 can also be replaced even in this case by a controllable switching element, similar to the second embodiment.

In addition to the illustrated embodiments, further embodiments using switching technology are, of course, also feasible. The decisive factor is ultimately only that the low-voltage network 4 in the event of malfunctions can be separated from the energy supply network 7 and the direct-current converter 5 and that a backflow of energy from the energy supply network 7 is safely and reliably prevented.

The invention claimed is:

1. A device for discharging an energy storage device (C) in a high-voltage network (3), having
   a direct-current converter (5) connected downstream of the high-voltage network (3),
   a low-voltage network (4) connected downstream of the direct-current converter (5) and configured to discharge the energy storage device (C),
   an energy supply network (7) connected downstream of the direct-current converter (5) and connected in parallel to the low-voltage network (4) for supplying energy to a control circuit (9) of the direct-current converter (5),
   a first controllable switching element (S) that is connected in the connecting line between the direct-current converter (5) and the low-voltage network (4) wherein in the case of a malfunction of the low-voltage network (4) the direct-current converter (5) and the energy supply network (7) can be separated from the low-voltage network (4), and
   a consumer connected downstream of the low-voltage network (4),
   wherein the energy supply network (7) is connected to the direct-current converter (5) by a first electric component (10; 20) that prevents a backflow of current from the energy supply network (7) into the direct-current converter (5),
   wherein the energy supply network (7) is connected to the low-voltage network (4) by a second electric component (11; 21) that prevents a backflow of current from the energy supply network (7) into the low-voltage network (4).

2. The device as claimed in claim 1, wherein the first electric component (10; 20) is embodied as a diode (10).

3. The device as claimed in claim 2, wherein the diode (10) is a Schottky diode.

4. The device as claimed in claim 1, wherein the second electric component (11; 21) is embodied as a diode (11).

5. The device as claimed in claim 4, wherein the diode (11) is a Schottky diode.

6. The device as claimed in claim 1, wherein the first controllable switching element (S) provides inverse-polarity protection.

7. The device as claimed in claim 1, wherein the high-voltage network (3) is connected by way of an alternating-current converter (2) to an electric machine (1) and the energy supply network (7) is used to supply energy to a control circuit of the alternating-current converter (2).

8. The device as claimed in claim 7, wherein the alternating-current converter (2) is a pulse-controlled alternating-current converter.

9. The device as claimed in claim 1, wherein the energy supply network (7) is used to supply energy to further electrical consumers.

10. A method for discharging an energy storage device (C) in a high-voltage network (3) as claimed in claim 1, wherein in the event of a malfunction of the low-voltage network (4), the direct-current converter (5) and the energy supply network (7) are separated from the low-voltage network (4).

11. The method as claimed in claim 10, wherein the energy supply network is connected to the low-voltage network (4) by a third controllable switching element (21) and the third controllable switching element (21) is closed for starting up the system in the event of the energy storage device not being charged.

12. The method as claimed in claim 9, wherein the energy storage device (C) is an intermediate circuit capacitor.

13. The method as claimed in claim 9, wherein the high-voltage network (3) is a direct-current intermediate circuit in a motor vehicle.

14. The device as claimed in claim 1, wherein the energy storage device (C) is an intermediate circuit capacitor.

15. The device as claimed in claim 1, wherein the high-voltage network (3) is a direct-current intermediate circuit in a motor vehicle.

16. The device as claimed in claim 1, wherein the first electric component (10; 20) is embodied as a second controllable switching element (20).

17. The device as claimed in claim 1, wherein the second electric component (11; 21) is embodied as a third controllable switching element (21).

* * * * *